United States Patent
Kallinen

(10) Patent No.: US 9,764,518 B2
(45) Date of Patent: Sep. 19, 2017

(54) COMPOSITE MANUFACTURING METHOD

(75) Inventor: Risto Kallinen, Bristol (GB)

(73) Assignee: Airbus Operations Limited, Bristol (GB)

( * ) Notice: Subject to any disclaimer, the term of this patent is extended or adjusted under 35 U.S.C. 154(b) by 656 days.

(21) Appl. No.: 13/137,262

(22) Filed: Aug. 2, 2011

(65) Prior Publication Data

US 2011/0300333 A1 Dec. 8, 2011

Related U.S. Application Data

(62) Division of application No. 12/309,263, filed as application No. PCT/GB2007/002045 on Jun. 4, 2007, now Pat. No. 8,057,623.

(30) Foreign Application Priority Data

Jul. 14, 2006 (GB) .................................. 0614087.5

(51) Int. Cl.
*B29C 70/44* (2006.01)
*B29C 70/46* (2006.01)
(Continued)

(52) U.S. Cl.
CPC .............. *B29C 70/44* (2013.01); *B29C 70/46* (2013.01); *B29C 70/543* (2013.01); *B29C 70/545* (2013.01); *B29D 99/0014* (2013.01); *B29L 2031/3076* (2013.01); *Y02T 50/433* (2013.01); *Y10T 156/10* (2015.01); *Y10T 156/1002* (2015.01); *Y10T 156/1043* (2015.01); *Y10T 428/24331* (2015.01); *Y10T 428/31504* (2015.04)

(58) Field of Classification Search
USPC ..................... 156/285, 286, 381; 29/464–468
See application file for complete search history.

(56) References Cited

U.S. PATENT DOCUMENTS

| 4,487,730 A | 12/1984 | Larribe |
| 4,683,018 A | 7/1987 | Sutcliffe et al. |

(Continued)

FOREIGN PATENT DOCUMENTS

| CA | 2 315 541 | 9/2001 |
| DE | 42 34 002 | 4/1994 |

(Continued)

OTHER PUBLICATIONS

EP Communication and Search Report for EP 11160091.2 mailed Jun. 16, 2011.

(Continued)

*Primary Examiner* — Christopher Schatz
(74) *Attorney, Agent, or Firm* — Nixon & Vanderhye P.C.

(57) ABSTRACT

A method of manufacturing a panel, the panel comprising a composite skin and at least one composite stiffener, the method comprising: positioning first and second mandrels on opposite sides of the stiffener; positioning first and second compaction tools on opposite sides of the skin; and compacting the skin between the first and second compaction tools by moving one or both of the compaction tools, wherein the movement of the compaction tool(s) causes the first and second mandrels to move towards the stiffener along inclined paths so as to compact the stiffener between the mandrels.

5 Claims, 8 Drawing Sheets

(51) Int. Cl.
  *B29C 70/54* (2006.01)
  *B29D 99/00* (2010.01)
  *B29L 31/30* (2006.01)

(56) References Cited

U.S. PATENT DOCUMENTS

| | | | | |
|---|---|---|---|---|
| 4,875,966 | A * | 10/1989 | Perko | 156/580 |
| 4,961,700 | A | 10/1990 | Dunbar | |
| 5,059,377 | A | 10/1991 | Ashton et al. | |
| 5,135,382 | A | 8/1992 | Tsuchiya et al. | |
| 5,141,690 | A * | 8/1992 | Marshall | 264/154 |
| 5,203,940 | A | 4/1993 | Krone | |
| 5,538,589 | A | 7/1996 | Jensen et al. | |
| 5,875,693 | A | 3/1999 | Zurbuchen et al. | |
| 6,644,641 | B2 * | 11/2003 | Phillips | 269/310 |
| 2001/0040317 | A1 | 11/2001 | Shiraishi et al. | |
| 2001/0045684 | A1 | 11/2001 | Blanchon | |
| 2005/0178083 | A1 | 8/2005 | Fournie et al. | |
| 2008/0124520 | A1 * | 5/2008 | Kondo | B23B 51/08 428/137 |

FOREIGN PATENT DOCUMENTS

| | | |
|---|---|---|
| EP | 0 409 354 | 1/1991 |
| EP | 0 418 843 | 3/1991 |
| EP | 1 145 829 | 10/2001 |
| EP | 1 231 046 | 8/2002 |
| EP | 1 288 124 | 3/2003 |
| EP | 1 481 790 | 12/2004 |
| EP | 1 555 204 | 7/2005 |
| FR | 2 670 153 | 6/1992 |
| GB | 577790 | 10/1938 |
| GB | 654925 | 7/1951 |
| GB | 2 310 822 | 9/1997 |
| JP | 60-11320 | 6/1983 |
| JP | 63-173623 | 1/1987 |
| JP | 5-121875 | 10/1991 |
| JP | 8-258069 | 3/1995 |
| JP | 2001-48097 | 2/2001 |
| JP | 2002-302097 | 10/2002 |
| WO | WO 02/092330 | 11/2002 |
| WO | WO 03011594 A1 * | 2/2003 |
| WO | WO 2004/041519 | 5/2004 |

OTHER PUBLICATIONS

UK Search Report for GB Application No. 0614087.5, dated Apr. 4, 2007, (2 pages).
International Search Report for PCT/GB2007/002045, mailed Dec. 4, 2007.
Written Opinion of the International Searching Authority for PCT/GB2007/002045, mailed Dec. 4, 2007.

* cited by examiner

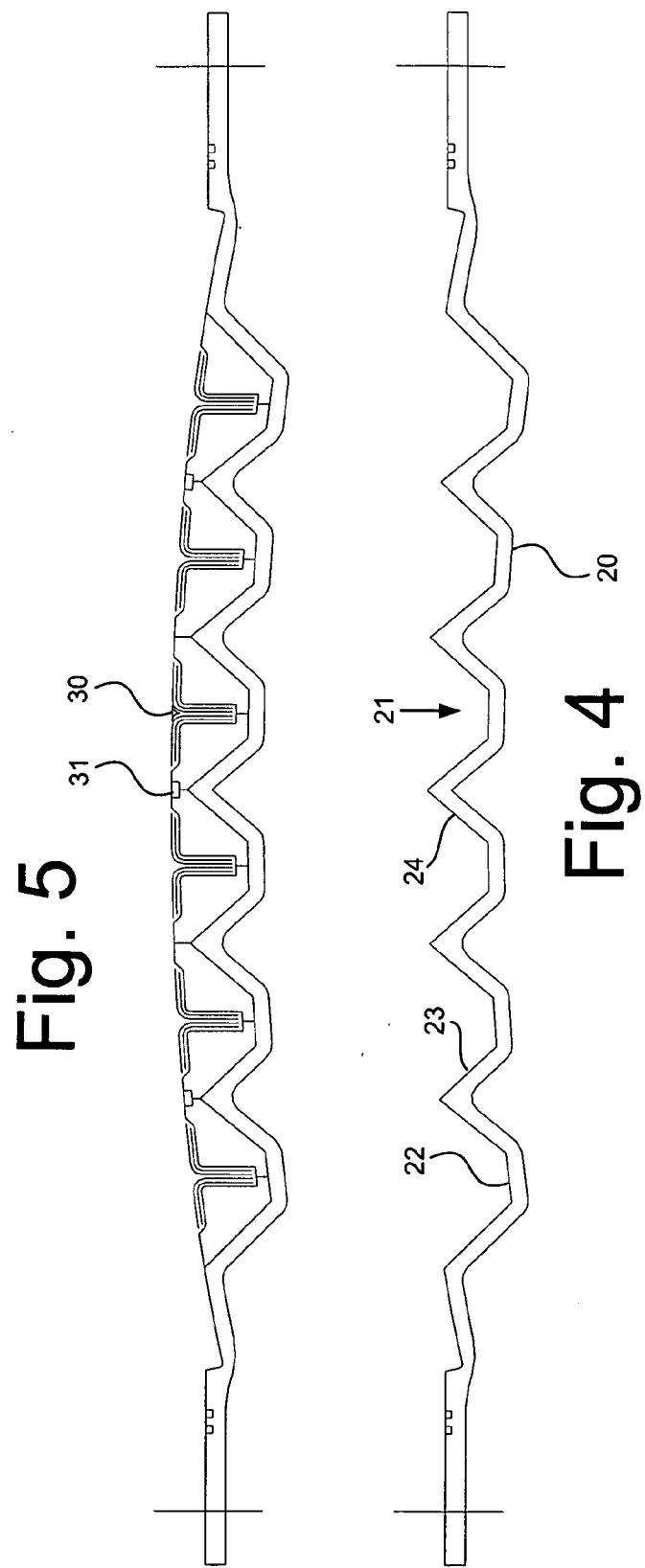

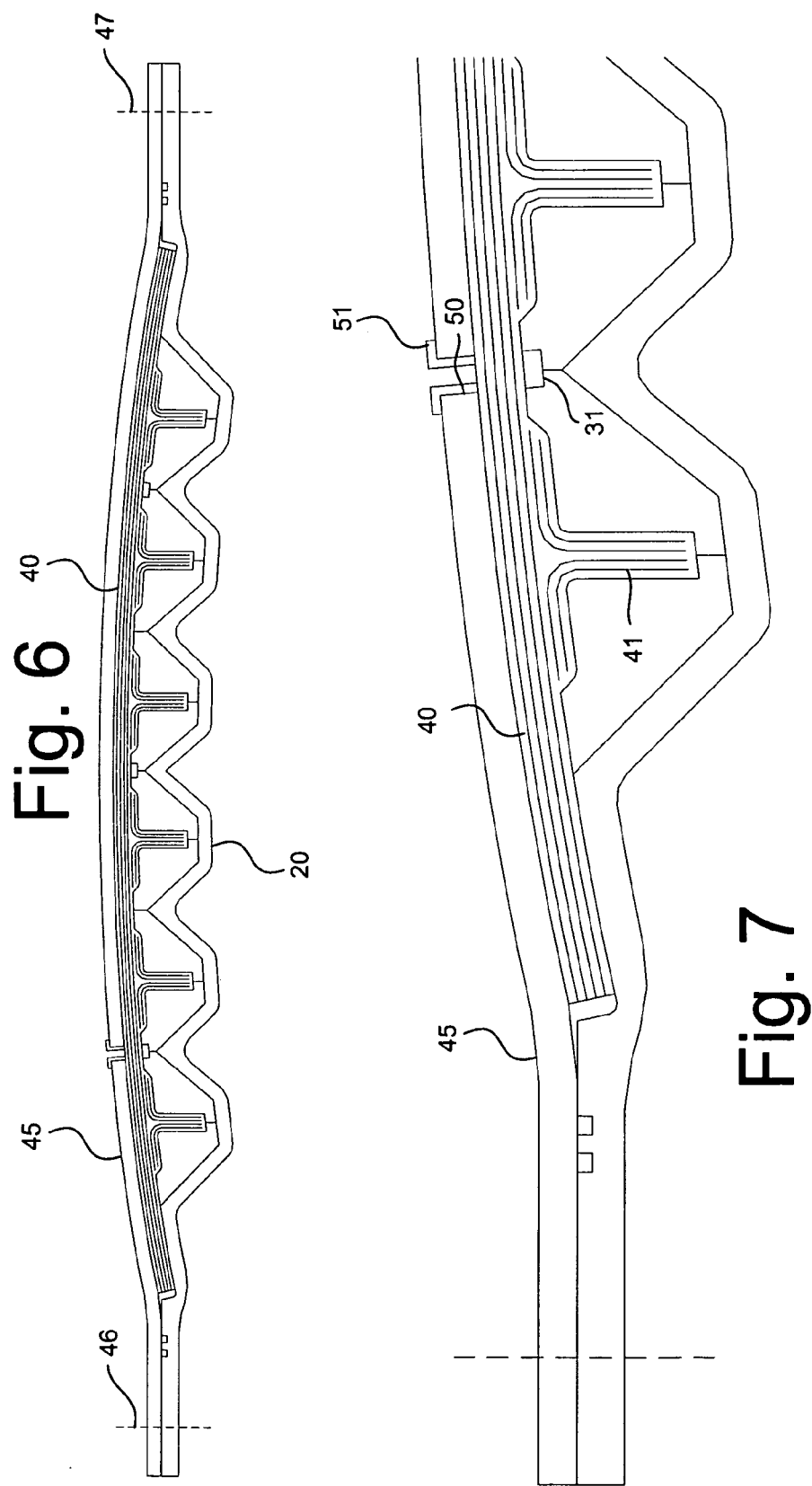

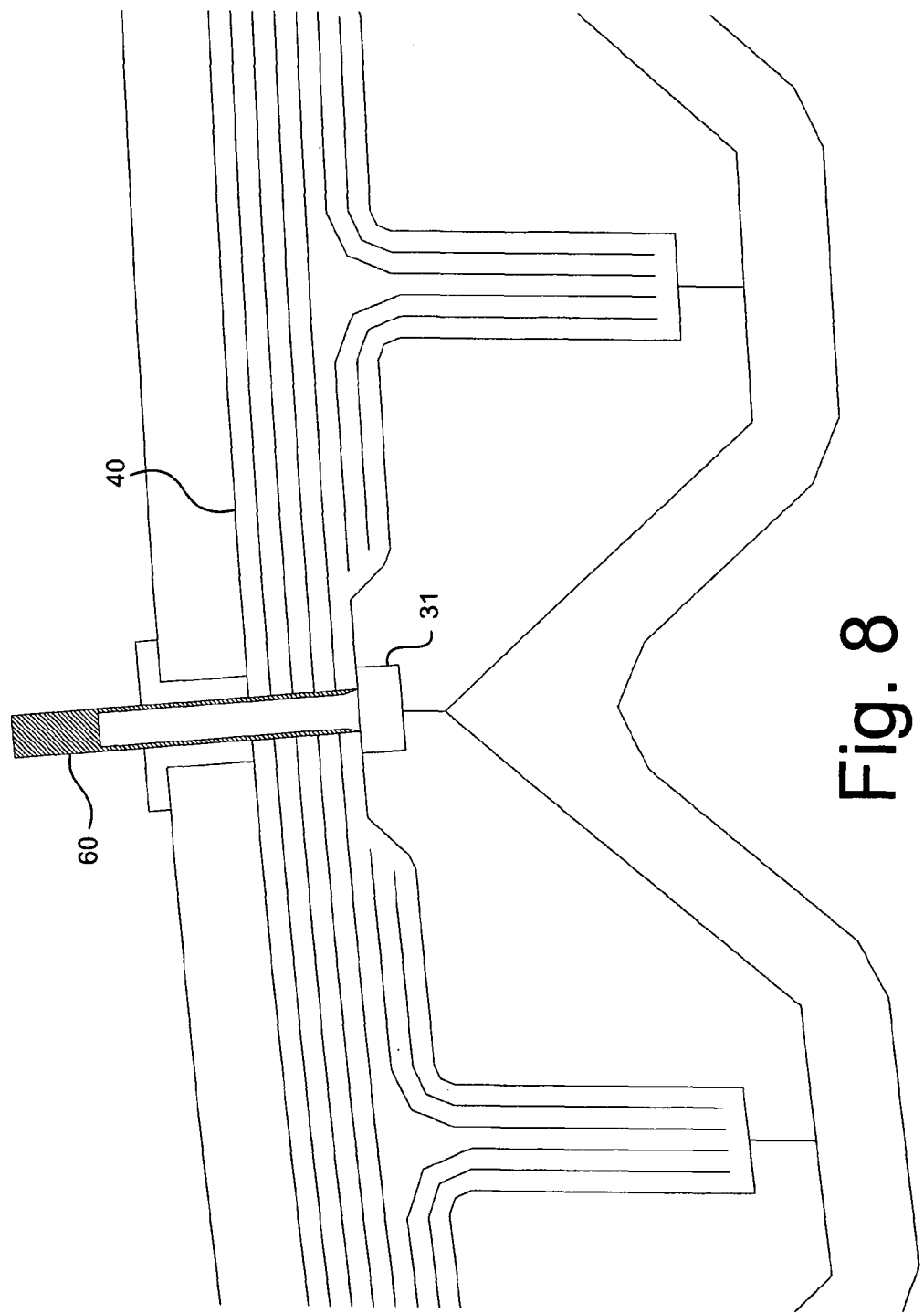

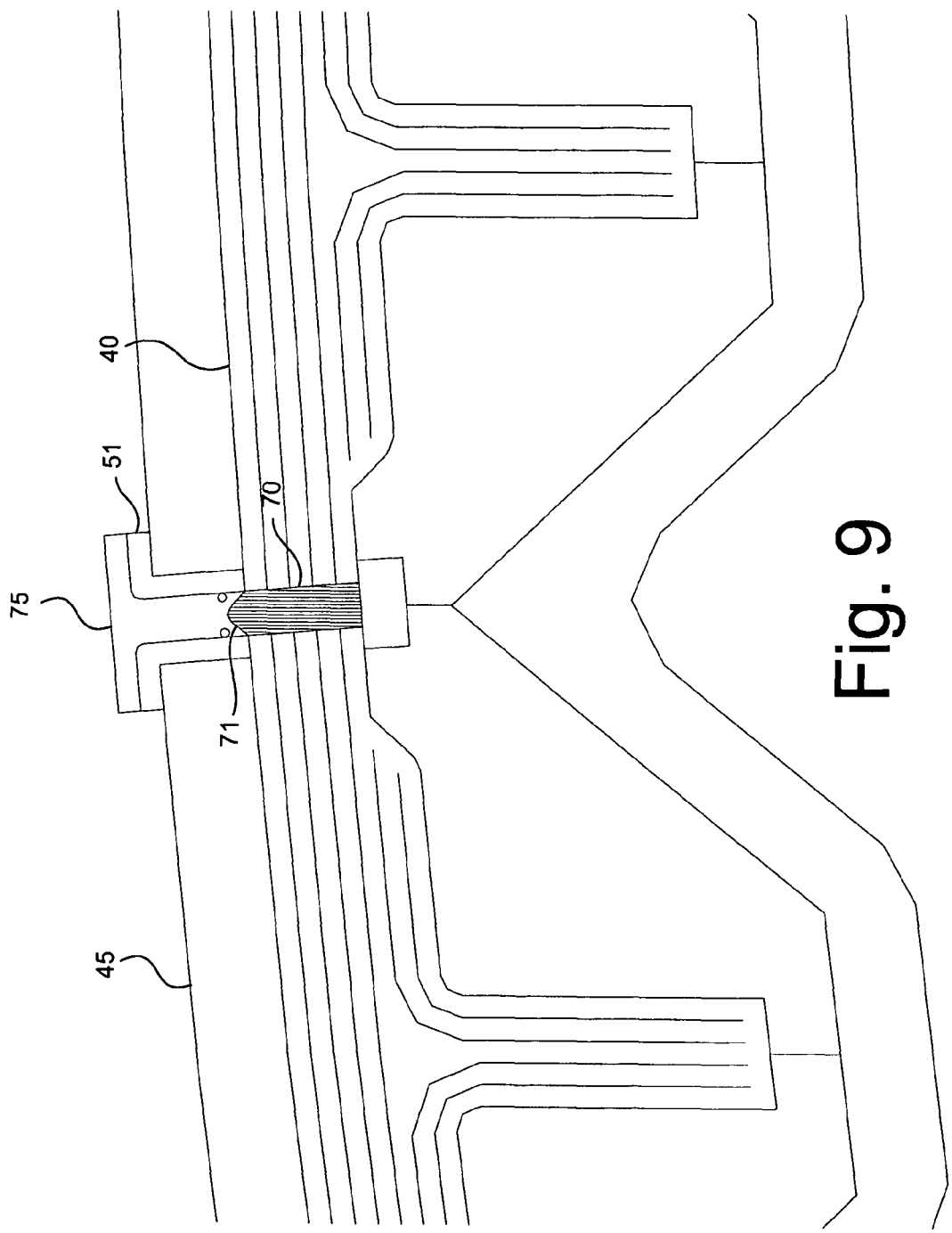

COMPOSITE MANUFACTURING METHOD

This application is a Division of application Ser. No. 12/309,263, filed Jan. 13, 2009, which is the US national phase of international application PCT/GB2007/002045, filed in English on 4 Jun. 2007, which designated the US. PCT/GB2007/002045 claims priority to GB Application No. 0614087.5 filed 14 Jul. 2006. The entire contents of these applications are incorporated herein by reference.

FIELD OF THE INVENTION

The present invention relates to a method and associated apparatus for manufacturing a composite laminate panel and manufacturing a composite laminate. The composite component is typically, although not exclusively, intended to form part of an aircraft.

BACKGROUND OF THE INVENTION

The wing or empennage structure of a modern airliner is typically a stiffened skin construction. Together with spars and ribs, the skin forms a torque box which will resist external loads.

In the case of a fuselage, the curved stiffened skin panels together with fuselage frames form the stiffened shell. Traditionally these skins are made from aluminium alloys, but as aircraft performance is becoming more and more important, composite skin panels are becoming more and more popular in aircraft primary structure construction.

Stiffened composite panels in primary structures may be used in horizontal tail plane, vertical tail plane and/or centre wing box construction. Typical for all these (excluding centre wing box) is that the skin is manufactured starting from the aerodynamic or outer surface. Since the thickness tolerance of the components is relatively poor this leads to additional costs in the final assembly where the resulting gaps and/or mismatches between skins, ribs and spars must be filled or adjusted with a suitable method to maintain the aerodynamic tolerance of the whole torque box.

Significant savings in the final assembly phase and completely new torque box designs could be utilised if the skin thickness tolerance could be maintained accurately enough so that both the outer mould line (aerodynamic) and inner mould line (e.g. spar & rib landings, main landing gear area) tolerances in critical locations could be controlled.

U.S. Pat. No. 4,683,018 describes a method of composite material manufacturing process in which a stack is placed on an upwardly directed female former, and then stamped by a male hydraulic press.

SUMMARY OF THE INVENTION

A first aspect of the invention provides a method of manufacturing a panel, the panel comprising a composite skin and at least one composite stiffener, the method comprising:
   positioning first and second mandrels on opposite sides of the stiffener;
   positioning first and second compaction tools on opposite sides of the skin; and
   compacting the skin between the first and second compaction tools by moving one or both of the compaction tools,
   wherein the movement of the compaction tool(s) causes the first and second mandrels to move towards the stiffener along inclined paths so as to compact the stiffener between the mandrels.

Typically the mandrels slide against inclined surfaces of one of the compaction tools as they move towards the stiffener. Typically the one of the compaction tools has a channel with a base, and first and second walls which are both inclined outwardly from the base; and the mandrels slide against the first and second walls as they move towards the stiffener.

A second aspect of the invention provides apparatus for manufacturing a composite panel, the apparatus comprising:
   first and second mandrels, each mandrel having a pair of inclined surfaces;
   a first compaction tool; and
   a second compaction tool having a first inclined surface engaging the first mandrel and a second inclined surface engaging the second mandrel.

A third aspect of the invention provides a method of manufacturing a panel, the panel comprising a composite skin and at least one composite stiffener, the method comprising:
   forming the stiffener on a mandrel;
   transporting the stiffener and mandrel to a joining station, the mandrel supporting the weight of the stiffener during the transporting step; and
   joining the stiffener to the skin at the joining station.

The use of the mandrel to support the weight of the stiffener during the transporting step minimizes handling costs and minimizes damage to the stiffener, which would otherwise have to be transferred to a separate transportation tool. Typically the method further comprises laying the skin onto the stiffener on the mandrel at the joining station, the mandrel supporting the weight of the stiffener during the laying step.

A fourth aspect of the invention provides a method of manufacturing a composite panel, the method comprising:
   fitting a control member through the panel;
   fitting a plug through a compaction tool;
   engaging the control member with the plug;
   engaging the plug with a datum surface of the compaction tool;
   compacting the panel with the compaction tool; and
   disengaging the plug from the control member after the panel has been compacted.

The fourth aspect of the invention enables the thickness of the panel to be accurately controlled by forming the compaction tool, plug and control member to a desired tolerance. The control member may be left in place in the panel, or removed in a subsequent processing step. Typically the compaction tool comprises a tool body and a guiding insert fitted into a hole in the tool body. The tool body, or more preferably the guiding insert, provides the datum surface. Typically the guiding insert has a flange which engages an outer surface of the tool body, and the plug has a flange which engages the flange of the guiding insert when the plug engages the control member.

A fifth aspect of the invention provides apparatus for manufacturing a composite panel, the apparatus comprising:
   a control member;
   a compaction tool for compacting the panel; and
   a plug which is dimensioned to pass through the compaction tool and engage the control member, and which can be disengaged after the panel has been compacted,
   wherein the compaction tool has a datum surface which engages the plug when the plug passes through the compaction tool.

Typically the control member is a cylindrical pin, formed of carbon or some other material which is compatible with the material forming the panel.

Typically the plug and control member have male and female parts which engage with each other when the plug passes through the compaction tool. Typically the male part tapers inwardly and the female part flares outwardly. This enables the parts to be disengaged at an angle. Preferably the male part protrudes from an outer or aerodynamic side of the panel.

A sixth aspect of the invention provides a method of manufacturing a composite laminate, the method comprising:

placing the composite laminate on an upwardly directed male tool whereby the composite laminate is locally compressed at a seed zone where it engages the male tool and droops under the action of gravity on two opposite sides of the seed zone; and deforming the laminate to cause the laminate to be molded against the male tool on the two opposite sides of the seed zone.

The method of the sixth aspect of the invention inverts the arrangement described in U.S. Pat. No. 4,683,018: that is with the male tool directed up instead of down. The resulting configuration enables the laminate to deform easily on the two opposite sides of the seed zone without wrinkling. By contrast, in the arrangement of U.S. Pat. No. 4,683,018 the stack is initially compressed at its two edges where it engages the female former, and droops under the action of gravity at its centre. This limits the ability of the stack to deform without wrinkling at is edges.

Typically the male tool is locally curved where it engages the composite laminate (that is, at the seed zone), and has inclined faces on the two opposite sides of the seed zone.

The methods of the invention may be used to form composite parts for a variety of applications, most typically as part of an aircraft. The part may be for instance a stiffened panel, or a stringer for a stiffened panel.

BRIEF DESCRIPTION OF THE DRAWINGS

Embodiments of the invention will now be described with reference to the accompanying drawings, in which:

FIG. 4 is a cross-sectional side view of a lower compaction tool;

FIG. 5 is a cross-sectional side view of the lower compaction tool with six stringers and mandrels in place;

FIG. 6 is a cross-sectional side view of the lower compaction tool with six stringers and mandrels, and an upper compaction tool in place;

FIG. 7 is an enlarged view through part of the assembly of FIG. 6;

FIG. 8 shows the formation of a pilot hole;

FIG. 9 shows a pin and plug in place;

DETAILED DESCRIPTION OF EMBODIMENT(S)

Figure 1:
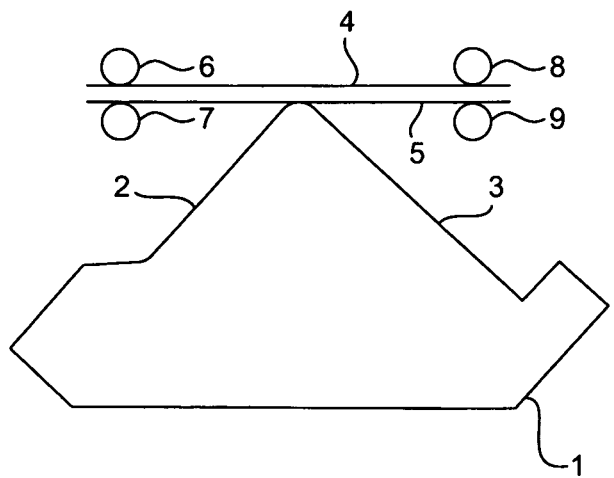
FIGS. 1-3 are cross-sectional side views of three steps in forming a preform.
Figure 2:
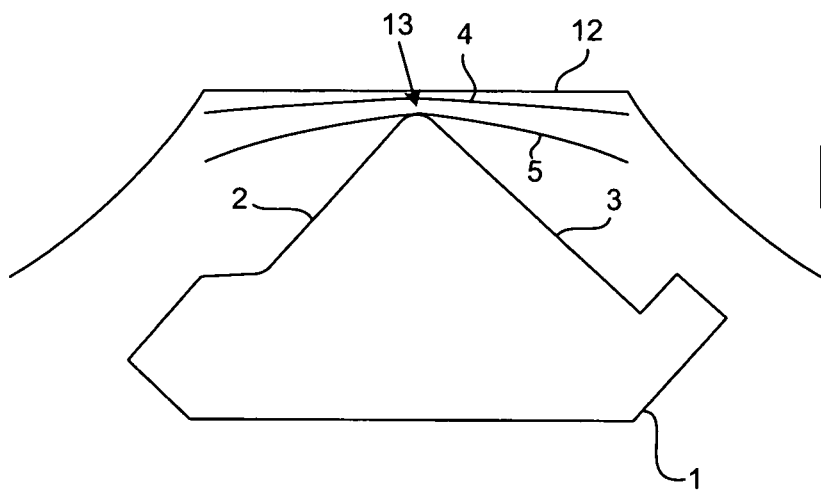
Figure 3:
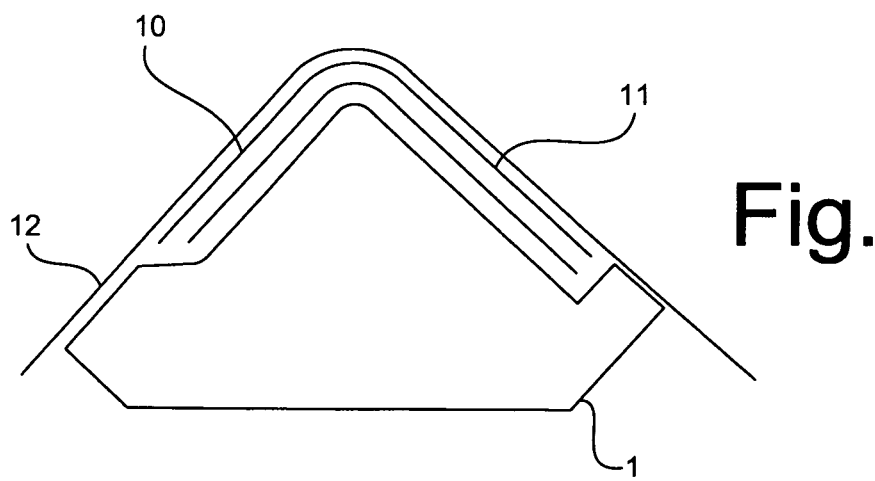

FIGS. 1-3 show a method of forming an L-shaped stringer preform. In a first step, a stack of prepregs is mounted in a "picture frame" support assembly. In FIG. 1 the stack of prepregs is shown as two plies 4,5 for illustrative purposes, but in general it will appreciated that any number of plies can be used. Each ply comprises an array of uniaxial fibres impregnated with resin. The fibres may be formed of any suitable material such as carbon, glass or aramid and boron. The fibres in adjacent plies run at different angles: for instance the fibres in one ply may run at 0° to the stringer axis, fibres in the next ply may run at may run at 45° to the stringer axis, and fibres in the next ply may run at 135° to the stringer axis (the stringer axis being the axis transverse to the section of FIGS. 1-3).

The picture frame support assembly comprises a set of spring-loaded rollers arranged around the periphery of the stack. FIG. 1 is a cross-sectional view through the stack so only four of the rollers 6-9 are shown. Instead of using a picture frame support assembly, any other suitable method of supporting the stack may be used.

A male mandrel 1 with a pair of inclined surfaces 2,3 is brought into contact with the stack and the picture frame support assembly is removed.

The stack is heated, typically to a temperature in the range from 90° C. to 120° C. The heat can be applied either by heating/cooling the mandrel 1, or by heating the stack with infrared heaters and then forming quickly before its temperature has reduced significantly.

A single diaphragm 12 is also laid onto the stack as shown in FIG. 2, and the cavity between the diaphragm and the mandrel is evacuated to deform the stack against the mandrel. Optionally a second diaphragm (not shown) may also be provided between the stack and the mandrel, and the cavity between the two diaphragms evacuated as well as the cavity between the lower diaphragm and the mandrel.

The portion 10 forms part of a stringer foot and the portion 11 forms part of a stringer blade when the L-shaped preform is placed back to back with another L-shaped preform as shown in FIG. 5.

As shown in FIG. 2, after the stack is placed on the upwardly directed male mandrel it is locally compressed in a region 13 where it engages the locally curved corner of the mandrel. This compacted region 13 provides a so-called "seed point" or "seed region" which acts as a seed for subsequent deformation of the stack. Note that the stack droops under the action of gravity on two opposite sides of the seed zone 13. The lower ply 5 droops more than the upper ply 4, giving a gradually increasing spacing between the plies on opposite side of the seed zone. Being unsupported on the two opposite sides of the seed zone 13, slippage can occur freely between the plies as they are molded against the male tool. The deformation of plies on both sides of the seed zone makes more complex designs possible (for instance over skin ramps or pad-ups) on both the foot portion 10 and the blade portion 11.

After forming, the preform is cut to net shape using an ultrasonic or waterjet cutter.

After all preforms have been formed, the preforms and mandrels are transported to a joining station, the mandrels supporting the weight of the stiffeners during the transporting step. A lower compaction tool 20 at the joining station is shown in FIG. 4. The tool 20 comprises six flared channels (one of the channels being labelled 21). Each channel 21 has a base 22, and first and second walls 23, 24 which are both inclined outwardly from the base. The tool 20 is also formed with a slight curve in the section shown in FIG. 4 (although the shape and depth of the curve may be different for other sections through the tool to give the desired shape for the panel).

After all the mandrels have been located as shown in FIG. 5, noodle fillers are installed between each back-to-back pair of preforms. Only one noodle filler 30 is shown for illustrative purposes 30. Cutting plates 31 are also installed in key interface areas of the panel where it is desirable to accurately control the panel thickness. Only one cutting plate 31 is shown in FIG. 5 but in general a number of such cutting plates will be distributed over the tool. The cutting plates 31 may be formed from polytetrafluoroethylene (PTFE), nylon, glass fibre, hard rubber, or a similar material. A vacuum bag cycle with heat could be applied at this stage to ensure all the mandrels and preforms are pre-compacted and in their correct location. This may be a particularly important process step with prepreg stiffeners to ensure that extra resin is bled from the lay-up.

A composite skin 40 is then laid with a contoured tape laying machine (or by hand lay-up) onto the mandrels as shown in FIGS. 6 and 7. This is advantageous compared with an alternative arrangement in which the assembly is oriented the other way round: that is, with the skin at the bottom and the stringers at the top. In this alternative arrangement, some means (other than the mandrels) must be provided to support the weight of the stringers as they are laid onto the skin.

An upper compaction tool 45 is then aligned with the lower compaction tool 20 using pins (not shown), which pass along lines 46,47 at the edge of the tools.

Breathing layers (such as thin layers of woven nylon cloth) may be incorporated between the mandrels and the stringers, and between the skin and the upper compaction tool 45. This is because some materials are slightly volatile and to achieve good quality the laminate must be allowed to "breathe".

Holes 50 are provided in the body of the tool 45 in line with the PTFE cutting plates 31. Each hole is fitted with a hardened steel guiding insert 51 with an annular flange 51, which engages the outer surface of the upper tool 45.

After the tools are aligned, pilot holes through the skin lay-up 40 are punched through the guiding inserts against the PTFE cutting plates 31 using a punching tool 60 shown in FIG. 8.

Figure 10:
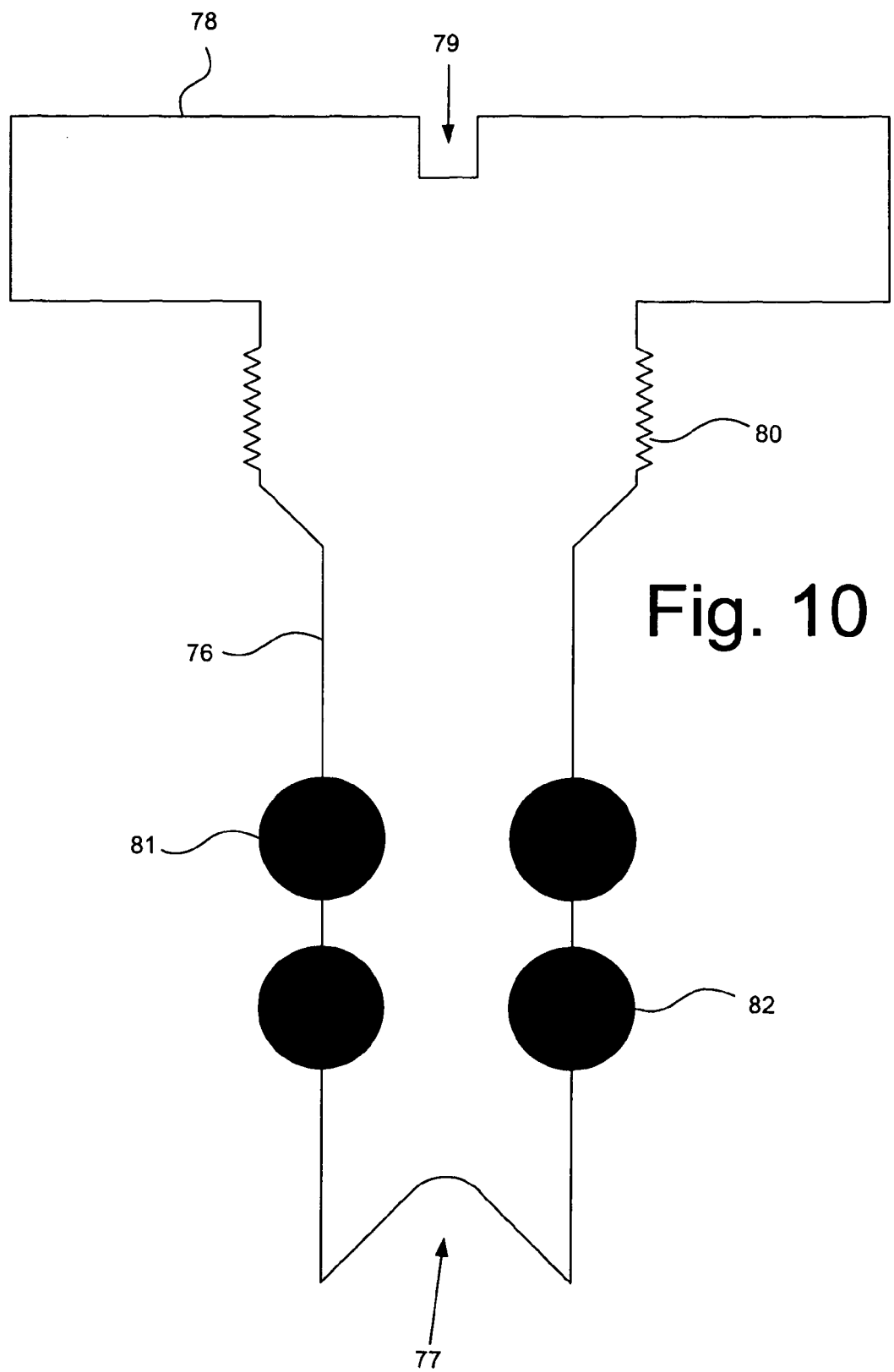
FIG. 10 shows the plug in detail.

Carbon pins 70 with inwardly tapering conical male ends 71 are then fitted into the holes in the skin 40 as shown in FIG. 9. Sealing plugs 75 shown schematically in FIG. 9, and in further detail in FIG. 10, are then installed through the guiding inserts. Referring to FIG. 10, each sealing plug 75 comprises a shaft 76 with a distal end having an outwardly flared conical recess 77, and a head 78 with a slot 79 for receiving a screwdriver. The shaft 76 has a threaded portion 80, and carries a pair of O-rings 81,82.

The guiding inserts have an internal screw thread (not shown) which enables the sealing plugs 75 to be screwed into the guiding insert through the upper compaction tool until the male end 71 of the carbon pin 70 engages the female recess 77 at the end of the plug 75, and the underside of the head 78 of the plug engages the flange 51 of the guiding insert. The flange 51 acts as a datum surface to accurately control the distance between the head of the plug and the PTFE cutting plate 31. The carbon pin 70 and the sealing plug 75 now define the thickness of the panel in combination with the stiffness of the upper tool 45 and the flange 51.

After all the carbon pins and sealing plugs are installed, the vacuum integrity of the whole tool is checked. The tool is then transferred to an autoclave for curing.

During curing, the tool is heated to approximately 180° C., a vacuum is applied between the tools 20,45, and the pressure in the autoclave is increased. To account for reduction in volume of the composite material during cure, resin may be injected between the tools during cure.

Optionally, a hot forming cycle may also be applied prior to the curing step. Vacuum and pressure are applied as in curing, but the temperature is elevated to a lower temperature (typically 90-120° C.).

After curing, the upper tool 45 is lifted away. The flared shape of the female part 77 of the plug 75 enables the upper tool 45 to be lifted away at an angle from the vertical if required, whilst easily disengaging the plug 75 from the pin 70. The pin 70 is then left intact in the panel. The pin 70 is typically positioned in an area where the skin is joined to a component such as a rib foot or spar foot on its inner side.

In a subsequent step, the carbon pin 70 (and an area of the panel surrounding the pin) is drilled away from the outer side of the skin to leave a hole with a closely controlled panel thickness in the region of the hole.

Note that the conical end 71 of the pin protrudes from the outer side of the skin 40 (which provides an aerodynamic surface in use) and the other end of the pin lies flush with the inner side of the skin. This has a number of advantages compared with an alternative arrangement where the pin protrudes from the inner side of the skin. Firstly it means that the component on the inner side of the skin (such as a rib foot or spar foot) does not require a conical recess to accommodate the protruding part of the skin; and secondly the protruding part is more easily visible from the outer side of the skin, making it easier to visually locate the pin for drilling.

The resulting reinforced panel is then used to form part of the skin structure of the wing, empennage or fuselage of an aircraft.

Figure 11:
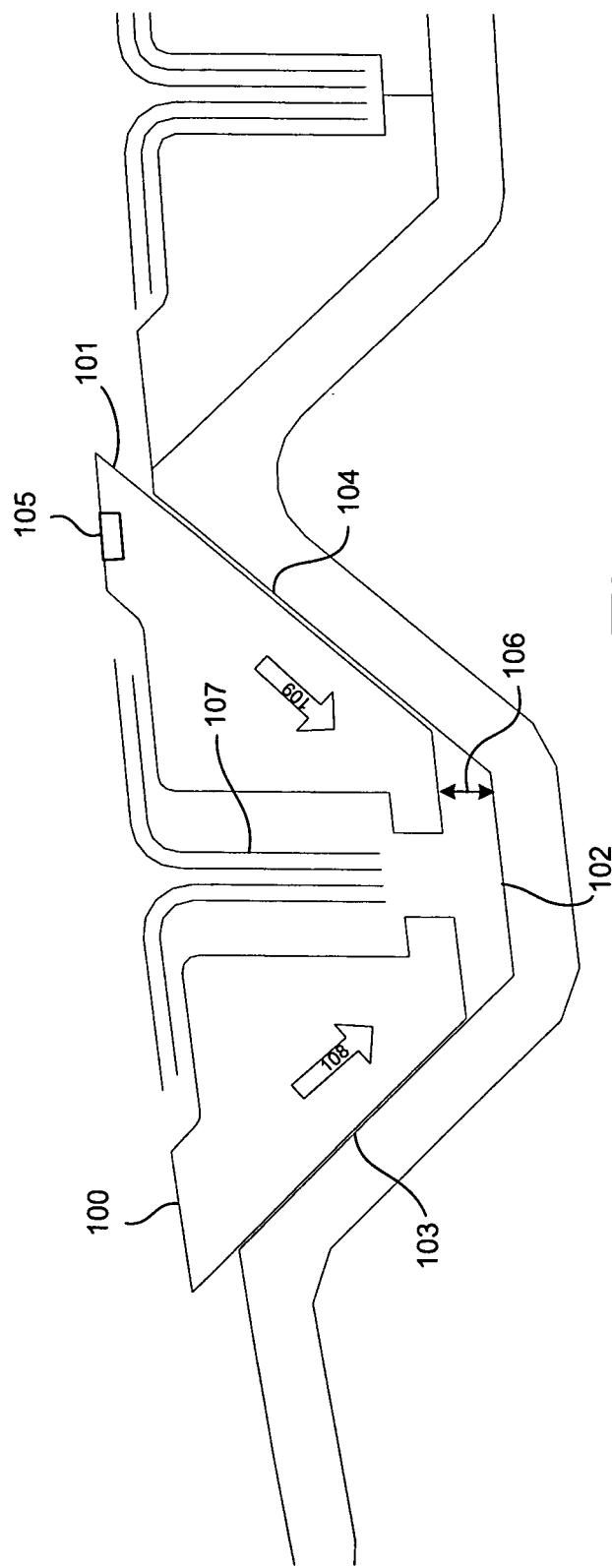
FIG. 11 is a cross-sectional side view of the lower compaction tool showing the movement of the mandrels during compaction.

During the hot forming and curing processes, the mandrels act to compact the stringer blades by the mechanism shown in FIG. 11. FIG. 11 illustrates a lower compaction tool having a slightly different profile to the tool shown in FIG. 6. However the mandrels in the tool of FIG. 6 also move in a similar manner during compaction.

FIG. 11 illustrates a pair of mandrels 100,101 in a flared channel defined by a base 102 and a pair of walls 103,104 which are both inclined outwardly from the base 102. A cutting plate 105 is fitted to one of the mandrels 101. FIG. 11 shows the position of the mandrels before the hot forming cycle. At this stage, the mandrels are displaced by a distance 106 from the base 102 of the channel. Note that the distance 106 is greatly exaggerated in FIG. 11 for purposes of illustration. The mandrels in FIG. 6 are also displaced from the base 22 of the channel 21 before hot forming and cure.

As the vacuum is applied, the inward movement of the compaction tools positioned on opposite sides of the skin causes the skin to be compacted. This relative movement of the compaction tools also causes the mandrels 100,101 on opposite sides of the stringer blade 107 to move towards the blade along inclined converging paths illustrated by arrows 108,109 so as to compact the blade between the mandrels. As they move, the mandrels slide against the inclined walls 103,104 of the channel in the compaction tool. The mandrels 100,101 move by approximately equal amounts to ensure that the centre of the stringer blade 107 is not moved left or right from its desired position.

The process above relates to the formation of a composite panel formed with prepregs. However the invention is equally applicable to forming a composite panel with dry fibres, woven dry fibres or non-crimped fabric (NCF). In this case the preform is cut to net shape using water jet cutting, or a net shape 3D woven preform may be used.

A completed (possibly 3D reinforced) flat skin is transferred on top of the preforms, making the process much faster compared to a prepreg tape laying tape machine. In the case of dry fibres a semi automated ply/fibre placement could be utilised.

Where a woven dry fibre preform is used it is also possible to insert through-thickness reinforcement through the stringer blades 41 to eliminate fasteners and/or to improve the damage tolerance.

Figure 12:
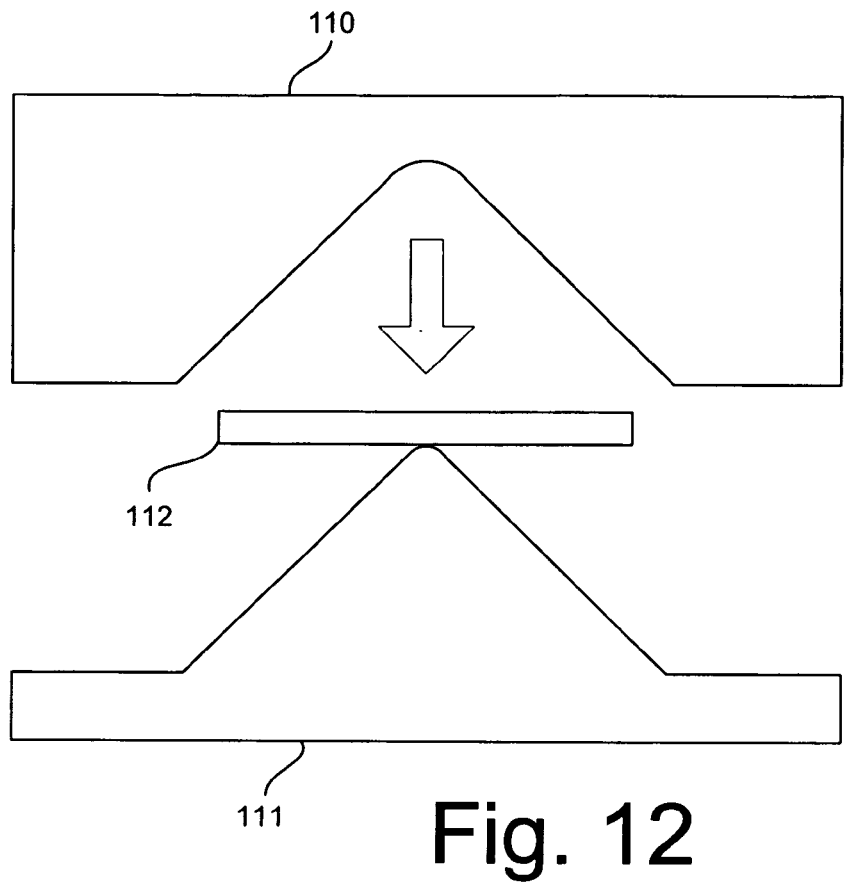
FIGS. 12 and 13 are cross-sectional side views of two steps in forming a preform using a female stamping tool.
Figure 13:
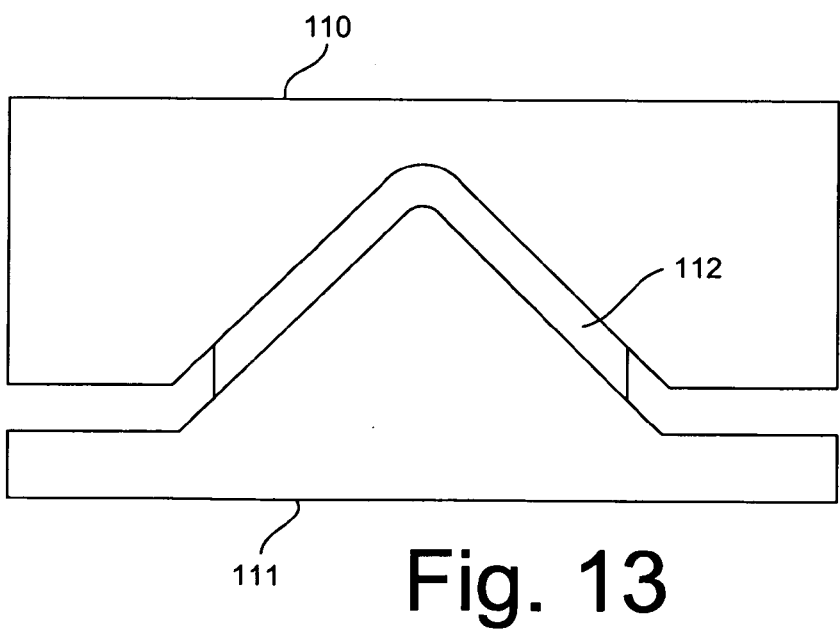

In the process shown in FIG. 1, the prepregs are formed on a male mandrel 1 in combination with one or two diaphragms. In the case of dry fabrics a female stamping tool could be used instead of the diaphragm(s), as shown in FIGS. 12 and 13.

A stack 112 is placed on an upwardly directed male mandrel 111. Note that drooping of the stack will occur as in FIG. 2, but is not shown in FIG. 12 to simplify the drawing. A female stamping tool 110 stamps down under hydraulic power until the stack has been deformed to conform with the male mandrel 111 as shown in FIG. 13. The press-forming method shown in FIGS. 12 and 13 gives the advantage of increased forming forces compared with the vacuum forming method shown in FIGS. 1-3, which can enable more complex stringer designs to be achieved.

As in the vacuum forming method, the stack is heated, typically to a temperature in the range from 90° C. to 120° C. The heat can be applied either by heating the tools 110,111, or by heating the stack with infrared heaters and then stamping quickly before its temperature has reduced significantly.

In the case of a prepreg, the part is cured in an autoclave, but in the case of a dry fibre part, infusion is performed out of autoclave with an integrally heated tool.

Although the invention has been described above with reference to one or more preferred embodiments, it will be appreciated that various changes or modifications may be made without departing from the scope of the invention as defined in the appended claims.

The invention claimed is:

1. A method of manufacturing a composite panel, the method comprising:
    fitting a control member through the panel;
    fitting a plug through a compaction tool;
    compacting the panel with the compaction tool to form a compacted panel;
    controlling thickness of said panel during compaction with the compaction tool by engaging the control member with the plug;
    engaging the plug with a datum surface of the compaction tool;
    disengaging the plug from the control member after the panel has been compacted without removing the control member from the compacted panel; and
    subsequently to the disengagement of the plug, removing the control member from the compacted panel by drilling through the control member and an area of the compacted panel surrounding the control member to form a hole through the compacted panel.

2. The method of claim 1 wherein the compaction tool comprises a tool body and a guiding insert fitted into a hole in the tool body, and wherein the guiding insert provides the datum surface.

3. The method of claim 1 further comprising engaging male and female parts of the plug and control member.

4. The method of claim 3 wherein the control member has a male part which engages a female part of the plug, and wherein the male part of the control member protrudes beyond an outer surface of the panel.

5. The method of claim 1 wherein the panel is an aircraft part.

* * * * *